United States Patent [19]

Obata et al.

[11] Patent Number: 4,670,094

[45] Date of Patent: Jun. 2, 1987

[54] METHOD OF MANUFACTURING A PHOSPHOR SCREEN

[75] Inventors: Yoshiharu Obata, Yokohama; Takashi Noji, Odawara; Masahiro Sugiyama; Shigeharu Kawamura, both of Yokohama, all of Japan

[73] Assignee: Kabushiki Kaisha Toshiba, Kawasaki, Japan

[21] Appl. No.: 837,786

[22] Filed: Mar. 10, 1986

Related U.S. Application Data

[62] Division of Ser. No. 604,117, Apr. 26, 1984, Pat. No. 4,598,228.

[30] Foreign Application Priority Data

Apr. 28, 1983 [JP] Japan .................................. 58-75044

[51] Int. Cl.[4] ........................ B44C 1/22; C03C 15/00; C03C 25/06

[52] U.S. Cl. ........................................ 156/655; 65/31; 156/657; 156/659.1; 156/663; 430/23

[58] Field of Search ...................... 156/655, 659.1, 663, 156/657; 65/31; 430/23, 25, 27, 321; 313/461, 467, 475; 350/96.24, 96.27

[56] References Cited

U.S. PATENT DOCUMENTS

| | | | |
|---|---|---|---|
| 2,979,632 | 4/1961 | MacNeille | 156/663 X |
| 2,995,970 | 8/1961 | Hicks et al. | 65/4.2 X |
| 3,294,504 | 12/1966 | Hicks | 65/4.2 X |

FOREIGN PATENT DOCUMENTS

| | | |
|---|---|---|
| 1593598 | 7/1970 | France . |

*Primary Examiner*—William A. Powell
*Attorney, Agent, or Firm*—Cushman, Darby & Cushman

[57] ABSTRACT

A phosphor screen which has an optical fiber plate formed of a number of bundled single optical fibers, each of which fibers consists essentially of a cylindrical core and a clad surrounding the curved peripheral wall of the core and a phosphor layer formed on one surface of the optical fiber plate, characterized in that the cylindrical core on the other surface of the optical fiber plate is removed, to provide a depression of a depth of at least 1 μm, thereby producing an image having high contrast.

7 Claims, 8 Drawing Figures

METHOD OF MANUFACTURING A PHOSPHOR SCREEN

This is a division, of application Ser. No. 604,117, filed Apr. 26, 1984, U.S. Pat. No. 4,598,228.

BACKGROUND OF THE INVENTION

This invention relates to a phosphor screen formed by depositing a phosphor layer on a substrate consisting of a fiber plate, and a method of manufacturing said phosphor screen.

An image tube containing a phosphor screen, such as an X-ray image intensifier, is mainly applied in medical uses, though it is also used in an industrial X-ray television designed for industrial nondestructive examination.

The above-mentioned X-ray image intensifier is constructed as illustrated, for example, in FIG. 1. An input screen 2 is set, on the input side, within a vacuum envelope 1. An anode 3 and output screen 4 are provided, on the output side, within said glass vacuum envelope 1. A focusing electrode 5 extends along the inner lateral wall of the vacuum envelope 1. The input screen 2 comprises a spherical aluminum substrate 6, an input phosphor layer 7 prepared from CsI and stretched along the output side (concave plane) of said substrate 6, and a photocathode 8 formed on the surface of said phosphor layer 7. The output screen 4 is formed of a substrate 9 and an output phosphor layer 10 settled on the surface of said substrate 9.

The X-ray image intensifier constructed as described above is operated in the following manner. An X-ray beam penetrating a foregoing subject and modulated in accordance with the magnitude of the X-ray transmittance of said foreground subject enters the X-ray image intensifier to excite the input phosphor layer 7. A light generated by said excitation energizes the photocathode 8, which in turn issues electrons. The released electrons are accelerated by the action of an electron lens comprised of an anode 3 and focusing electrode 5 and focused on the output phosphor layer 10, which in turn irradiates a light. The above-mentioned process amplifies the electrons. Thus, a light image decidedly brighter than the light image obtained by the input phosphor layer 7 is released from the output phosphor layer 10.

Japanese Patent Application Disclosure No. 53-24,770 discloses an X-ray image intensifier of the above-mentioned type, which is characterized in that contrast is improved by forming an output phosphor layer on an optical fiber plate. As shown in FIG. 2, an output screen 16 consists of an optical fiber plate 17 and an output phosphor layer 10 deposited on said optical fiber plate 17, and is placed on the output side within the vacuum envelope 1. The above-mentioned construction of the output screen 16 makes it impossible to directly draw out an image signal from the vacuum envelope, unlike the arrangement in which the optical fiber plate is used as part of the vacuum envelope, and therefore requires the application of a lens system. However, the proposed X-ray image intensifier has an advantage in that an accelerating voltage can be impressed in the same manner as in the X-ray image intensifier shown in FIG. 1. Nevertheless, the device proposed in said Japanese patent application disclosure No. 53-24,770 also has drawbacks in that the improvement in the image contrast still remains unsatisfactory. The reason for this is given below. FIG. 3 illustrates the manner in which light reflection taken place within the optical filber. The optical fiber consists of a core 101 and clad 102. Let us assume that $n_1$ denotes the refractive index of the core 101, $n_2$ represents the refractive index of the clad 102, and $n_0$ shows the refractive index of a vacuum. Then, the maximum value of an incident angle $\theta_0$ with respect to the optical fiber, which is required to assure the transmission of a light through the optical fiber, by repeating total reflection, may be expressed as follows:

$$n_0 \sin \theta_0 = \sqrt{n_1^2 - n_2^2}$$

For the sake of description, let it be assumed that $n_1$ equals 1.8, and $n_2$ equals 1.49. In such a case, the incident angle $\theta_0$ is determined, from the above equation to be about 90°. This means that all light rays entering the optical fiber from the region of the vacuum are transmitted through said optical fiber. To confirm this event concretely, the refractive angle $\theta_1$ of a light ray entering the core 101 at an angle of, e.g., 90° is determined to be 33.7° from the equation, where $n_1 \sin \theta_2 = n_2 \sin \theta_0$. The critical angle $\theta_2$ of total reflection at the boundary between the core 101 and clad 102 is determined to be 55.9° from the equation, where $n_1 \sin \theta_2 = n_2 \sin \theta_3$ ($\theta_3 = 90°$). An incident angle $\phi_1$ of a light ray having a refractive angle $\theta_1$ of 33.7° with respect to the boundary between the core 101 and clad 102 is 90°-33.7°, which equals 56.3°; a value larger than the aforementioned critical angle. Therefore, the light ray is transmitted through the fiber by repeating total reflection, without leaking into the adjacent fiber, and is finally brought to the opposite plane of the fiber to that plane thereof at which the light enters. An outgoing angle $\theta_2$ of the light equals the incident angle $\theta_0$ of the light.

When, however, a phosphor layer is deposited over an optical fiber plate, a noticeable change occurs in the above-process of light transmission. The manner in which the light is transmitted through the fiber plate 17 may now be described with reference to FIG. 4. The phosphor layer 10 is generally formed by attaching phosphor particles 201 to the surface of the fiber plate 17 by means of a vitreous bonding agent. The fiber plate 17 and phosphor particles 201 are in firm contact with each other, as optically viewed. Accordingly, the light having 33.7° of $\theta_1$ in FIG. 3, incident to the central axis of the core 101 through the vitreous bonding agent layer from the phosphor particles without passing via the space, is transmitted from the emitting surface of the core 101 at 90°. In other words, there exists a light which is emitted at a wide angle of 0° to 90° on the emitting surface of the core 101 irrespective of the degree of the contact of the phosphor layer 10 with the optical fiber plate 17.

On the boundary surface between substances of a different refraction index, there exists a light which is reflected on the boundary surface at the same angle as the incident angle, except the light which passes through the boundary emerges as the refracted light. This phenomenon is called "Fresnel's reflection". Fresnel's reflection is largely affected by the incident angle. The relationship between the incident angle and the reflectance of the reflected light by the Fresnel's reflection is shown in FIG. 5. In FIG. 5, curves a and b illustrate the reflectance of the reflected light by Fresnel's reflection generated when the light is incident from a vacuum into a glass, curves c and d illustrate the reflectance of the reflected light by Fresnel's reflection generated when the light is incident in a glass into the air. Curves a and c illustrate components on the incident surface which includes the incident light and a vertical line to the boundary surface of the reflectance, and curves b and d illustrate components on the plane vertical to the incident surface of the reflectance. As apparent from FIG. 5, the reflectance of the reflected light by Fresnel's reflection becomes vigorously large as the incident angle increases.

The light A emitted from the fiber plate 17, as shown in FIG. 4, is reflected on the incident surface and the emitting surface of the output window 18 by the influence of the abovementioned Fresnel's reflection, and returned as light rays B, C to the fiber plate 17. These lights, such as light ray B, are observed to be generated from the phosphor particles different from the phosphor particle initially generated, and the contrast accordingly decreases.

SUMMARY OF THE INVENTION

It is an object of the present invention to provide a method of producing a phosphor screen formed with a phosphor layer on an optical fiber plate in which a light emitted from the fiber plate prevents Fresnel's reflection in a transparent member opposed to the fiber plate, thereby enabling an image of high quality having excellent contract to be obtained.

Another object of the present invention is to provide a method of manufacturing said phosphor screen.

According to the present invention, there is provided a phosphor screen which comprises an optical fiber plate formed of a number of bundled single optical fibers, each of which fibers having a cylindrical core, and a clad surrounding the curved peripheral wall of the core, and a phosphor layer formed on one surface of the optical fiber plate. The cylindrical core on the other surface of the optical fiber plate is removed, to provide a depression of a depth larger than 1 μm. The diameter of the core is preferably 15 μm or less.

A light-absorbing layer is preferably formed on the side wall of the depression and/or the end surface of a projection defining the depression. The light-absorbing layer is formed of carbon, or metal such as aluminum, chromium, nickel or nickel chromium.

In the phosphor screen of the present invention, a core in the opposite surface to the phosphor layer of an optical fiber plate is removed and a depression is formed. Thus, the light which is generated from the phosphor layer, transmitted in the core, and emitted from the core at a large angle, is incident to a clad forming the side wall of the depression, and attenuated, while the small angle light is merely emitted from the core at a small angle and incident to an output window. In this manner, Fresnel's reflection on both surfaces of the output window is less, and the image contrast is accordingly significantly improved. Particularly, when a light-absorbing layer is formed on the depression of the side wall of the depression and/or the end surface of the projection defining the depression, the light emitted from the core at a large angle is largely attenuated, thereby effectively improving the image contrast.

The formation of the depression is readily formed by treating the optical fiber plate with acid solution such as hydrochloric acid or nitric acid.

BRIEF DESCRIPTION OF THE DRAWINGS

The invention is best understood by reference to the accompanying drawings of which.

DETAILED DESCRIPTION OF THE PREFERRED EMBODIMENTS

The embodiment of the present invention applied to the output screen of an image tube will be described with reference to the accompanying drawings.

Figure 6:
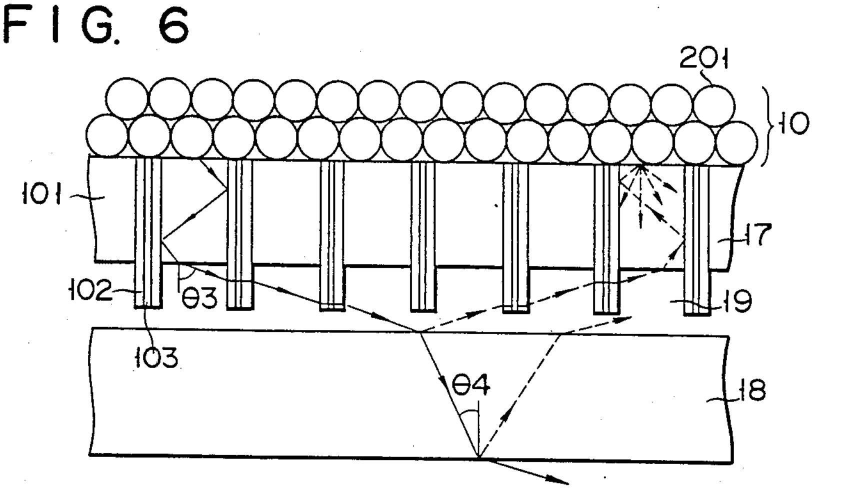
FIG. 6 is a sectional view showing the essential part of a phosphor screen according to an embodiment of the present invention.

In FIG. 6, a fiber plate 17 is formed of bundles of single fibers arranged side-by side, and each single fiber is composed of a cylindrical core 101, a clad 102, and a light-shielding layer 103. An output phosphor layer 10 which includes a number of phosphor particles 21 is formed on one surface of the fiber plate 17. The core 101 is removed on the other surface of the fiber plate 17, i.e., on the surface opposite to the phosphor layer 10, and depressions 19 are formed. These depressions can be formed by treating the fiber plate with an acid. In general, a glass having a high refractive index have a high metal content, and is accordingly more quickly corroded by the acid as compared with glass having a low refractive index. Accordingly, the fiber plate is dipped in acid solution such as hydrochloric acid or nitric acid, the core glass 101 having high refractive index is quickly corroded, compared with the clad glass 102 having low refractive index, to form the depressions 19. When the entire fiber plate is dipped in acid solution, the depressions are formed on both side surfaces of the fiber plate, but when it is desired that the depressions are formed only on the emitting side surface, only the surface may be dipped in the acid solution, or the entire fiber plate may be dipped in the solution while the incident surface thereof is masked.

The depths of the depressions 19 are 1 μm or more, and preferably 1 to 20 μm. If less than 1 μm, the effect of preventing the Fresnel's reflection is not performed, and the image contrast is not accordingly improved. When the core 101 is corroded by the acid solution, not only the core 101 but part or all of the clad 102 might be corroded in the end thickness. Particularly when the all of the end thickness of the clad 102 is corroded, only the light-shielding layer 103 which isolates the single fiber, remains. Even in this case, the light emitted at a large angle from the emitting surface of the core 101 and is incident to the thin end portion of the clad 102 or the light-shielding layer 103, is attenuated. Thus, the image contrast can be improved.

The step of forming the depressions on one surface of the fiber plate 17 may be before or after the formation of the output phosphor layer 10 on the other surface. When the depressions 19 are formed after the formation of the output phosphor layer 10, a masking is formed on the output phosphor layer 10, and it is necessary to separate the output phosphor screen from the acid solution by masking the output phosphor layer 10.

With the above-mentioned fiber plate 17, the diameter of a single fiber is of great significance, from the standpoint of assuring the good resolution of an image. Let us assume Dmm represents the diameter of a single fiber; f lp/mm denotes the space frequency of a light beam; and F(f) indicates the degree of modulation of the sinusoidal wave input, which shows the image transmission capacity of an optical fiber. Then, F(f) may be expressed as follows:

$$F(f) = \left(\frac{2J_1(\pi fD)}{\pi fD}\right)^2 \times 100\ (\%)$$

($J_1$ = primary Bessel function)

In an image tube, it is generally preferred with a high quality image that when a light beam has a space frequency f of 30 lp/mm, the degree of modulation of the sinusoidal wave be set at a level higher than 50%. When the term F(f) of the fiber plate 17 is calculated on the basis of the requirement, the diameter D of the single fiber should be 16 microns or less. If an output image from the image tube has a large diameter, the image will decrease in brightness, making it necessary to provide a large-diameter lens. Therefore, the fiber plate 17 entailed by the phosphor screen embodying this invention should preferably have an effective diameter of less than 100 mm.

As described above, this invention provides a phosphor screen which enables the fiber plate to improve its performance, while producing an image having a far higher quality and indicating a contract higher than was formerly possible.

Figure 1:
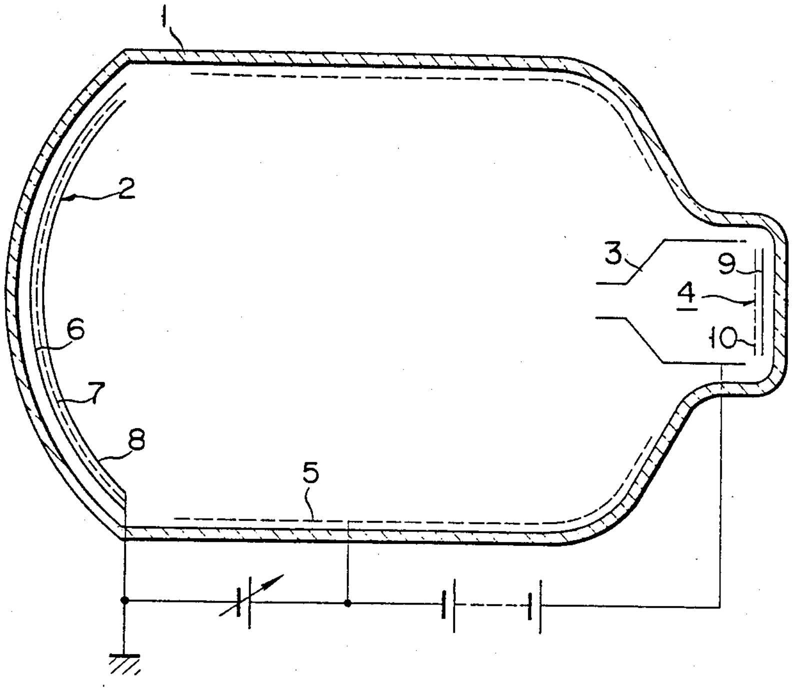
FIG. 1 (PRIOR ART)
FIG. 1 is a schematic view showing a general structure of an X-ray image intensifier.
Figure 2:
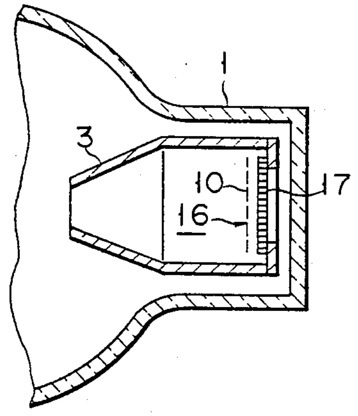
FIG. 2 (PRIOR ART)
FIG. 2 is a sectional view showing the output structure of a conventional image tube using as the substrate of a phosphor screen an optical fiber plate.
Figure 3:
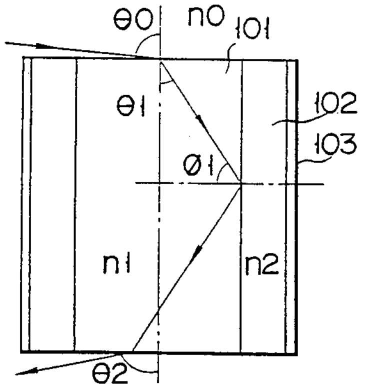
FIG. 3 (PRIOR ART)
FIG. 3 is a view showing the transmission of light in the core of the optical fiber plate.
Figure 4:
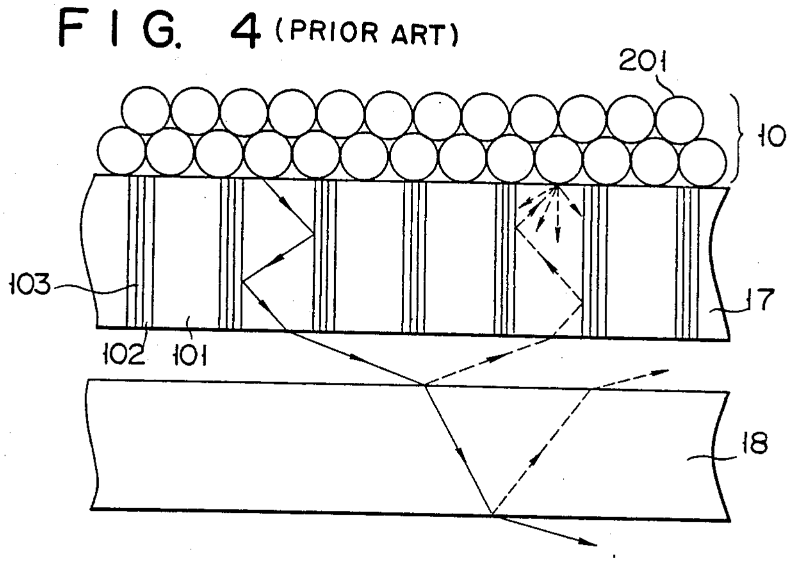
F I G. 4 (PRIOR ART)
FIG. 4 is a sectional view showing the essential part of the phosphor screen in the output structure shown in FIG. 2.
Figure 5:
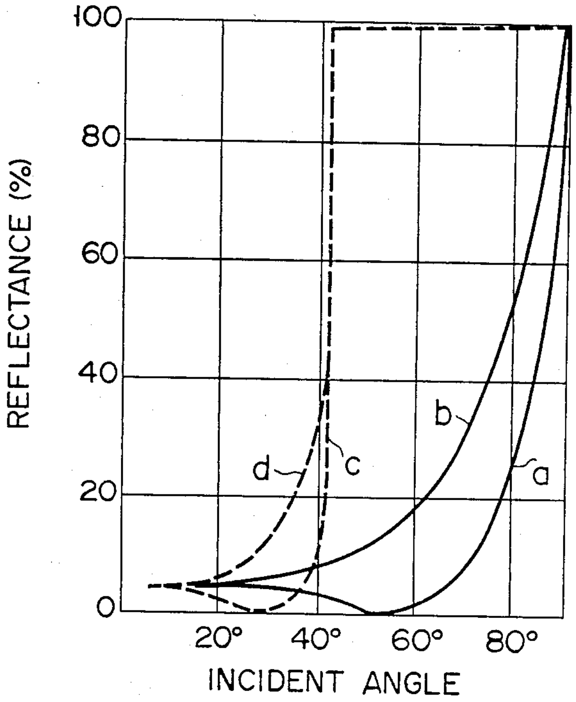
F I G. 5 (PRIOR ART)
FIG. 5 is a graph showing the relationship between the incident angle and the reflectance of the light reflected by Fresnel's reflection.

The reason why excellent contrast property is obtained by the phosphor screen of the present invention will now be explained. As shown in FIG. 4, if the depressions 19 are not formed, of the light which is generated from the output phosphor layer 10, transmitted in the core 101, and emitted from the end surface, the light having the emitting angle $\theta_3$ larger than a predetermined angle is incident to the output window 18 at a large angle, and Fresnel's reflection of high intensity is produced on both side surfaces of the output window 18. On the other hand, if the depressions 19 are formed, the light passes in the clad 102 and/or the light-shielding layer 103 several times to several tens of time to be incident to the output window 18, refracted therein and emitted. At this time, part of the light is subjected to Fresnel's reflection on both side surfaces of the output screen 18, as shown by a broken line in FIG. 6, and incident to another position from the emitting unit of the fiber plate 17. However, the light which is subjected to the Fresnel's reflection passes in the clad 102 and/or the light-shielding layer 103 to be attenuated and weakened in the intensity, and the intensity of the light which is subjected to the Fresnel's reflection is very weakened. In other words, as shown in FIG. 5, the light incident to the output window 18 at the incident angle producing the large Fresnel's reflection is passed in the clad 102 and/or the light-shielding layer 103 to be attenuated, and the influence of the Fresnel's reflection can be alleviated. According to the inventor's experiments, preferable results could be obtained when the depth of the depressions 19 is determined such that the light having 60° or larger angle of emitting angle from the core 101 passes through the clad 102 and /or the light-shielding layer 103.

As shown in FIg. 5, Fresnel's reflection in the boundary surface between the glass forming the output window 18 and the air is abruptly increased from 38°. However, as shown in FIG. 6, when the emitting angle $\theta_3$ from the core 101 is 60°, the refractive index of the glass is set to 1.49. Thus, the angle $\theta_4$ of the light incident to the boundary surface between the glass and the air becomes 35.26°, which is smaller than the 38°. Accordingly, the influence of the Fresnel's reflection in this boundary surface is less.

For the reasons described above, according to the phosphor screen of the present invention, the image contrast can be remarkably improved. Let us assume that a fiber plate having a thickness of, e.g., 0.5 mm is applied, that portion of the phosphor layer from which a light beam is emitted has a diameter of 20 mm, and that an electron beam shielding plate occupying 10% of the area of the above-mentioned light-emitting portion of the phosphor layer is provided at the center of said light-emitting portion at one time and is not provided there at another time. When an image contrast is defined in terms of a comparison between the brightnesses realized in the presence and absence of said electron beam shielding plate, the phosphor screen of this invention assures a noticeably improved image contrast of about 100:1, versus the approximate ratio of 50:1 which is indicated by the image contrast of the conventional phosphor screen.

Figure 7:
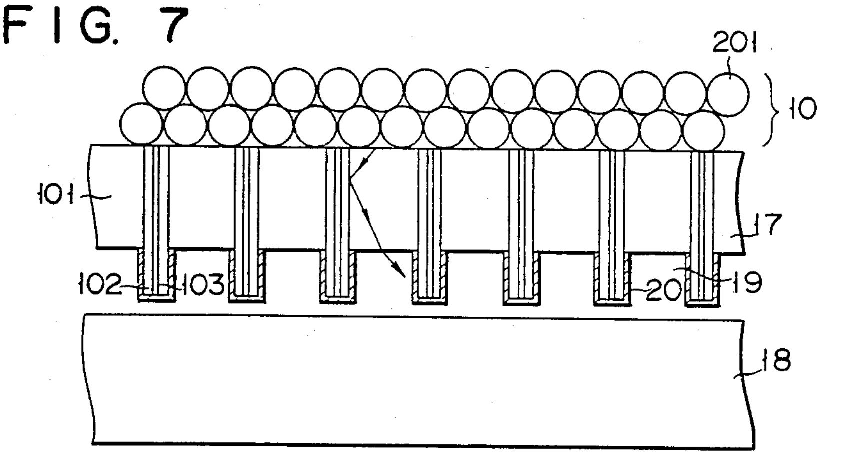
FIG. 7 is a sectional view showing the essential part of a phosphor screen according to a modified embodiment of the present invention.

FIG. 7 shows a modified embodiment of a phosphor screen according to the present invention. In this phosphor screen, a light absorbing layer 20 formed of carbon, or metal such as aluminum, chromium, nickel, or nickel chromium is formed on the side wall of the depressions 19 and the end surface of a projection defining depressions 19, which are formed of the clad 102 and light-shielding layer 103. The light emitted from the core 101 and incident on the side wall of the depressions 19 is almost absorbed by the light absorbing layer 20 and does not reach the output window 19, and accordingly the improvement of the image contrast can be further intensified. Further, the light emitted not from the end surface of the core 101 but passed through the clad 102 is also absorbed by the light absorbing layer 20. Thus, the image contrast can be improved irrespective of the presence and absence of the depressions 19. The light absorbing layer 20 may be formed on either one of the side walls of the depressions 19 and the end surface of the projection.

In FIG. 7, the light absorbing layer 20 is formed to cover the side walls of the depression and the end surface of the projection. In other words, the bottom of the depression is not covered with the light absorbing layer 20. The light absorbing layer 20 is formed by a vacuum vapor deposition of a metal. Specifically, a phosphor screen or fiber plate provided with depressions 19 is arranged in a vacuum vapor deposition apparatus, with aluminum pellets disposed in the position of the evaporation source. The phosphor screen or fiber plate should be inclined relative to the evaporation source. The angle of inclination is determined by the depth and diameter of the depression 19. In order to form the light absorbing layer 20 to cover substantially the entire side wall of the depression 19, it is necessary to rotate the phosphor screen or fiber plate, which is kept inclined, about its own axis.

In the vacuum vapor deposition, the evaporated aluminum particles run in a predetermined solid angle. Thus, it is possible and efficient to arrange a number of phosphor screens or fiber plates in the apparatus and to rotate them about their own axes or in orbit so as to form the light absorbing layer on a number of phosphor screens of fiber plates at a time.

It is of course possible to form the light absorbing layer 20 without rotating the phosphor screen or fiber plate. If the phosphor screen or fiber plate is not rotated at all, a light absorbing layer is partially formed on the side walls of the depression. Even in this case, it is possible to improve the contrast characteristic. In the vapor deposition process, a light absorbing layer 20 having a sufficient concentration is formed not only on the side walls of the depression, but also on the surfaces of the clad 102 and the light-shielding layer 103 because these surfaces also face the evaporation source. It is unnecessary to form a light absorbing layer 20 on the surface, which faces the phosphor layer, of the phosphor screen or fiber plate or on the surface on which a phosphor layer is formed later. Thus, it is desirable to use a shielding material in the vapor deposition step to prevent the light absorbing layer from being formed on the surface of the phosphor layer or on the phosphor layer-forming surface.

It is possible to use C, Ni, Cr, NiCr, etc., in addition to aluminum because these materials also permit forming a dark brown light absorbing layer exhibiting a satisfactory light shielding characteristic.

In performing the vapor deposition, the apparatus is evacuated to provide a vacuum of $1\times10^{-4}$ Torr or less. A thin film providing the light absorbing layer 20 should be formed in a thickness of 100–2,000 521 as measured by a monitor. The resultant light absorbing layer has a sufficient adhesion to the substrate, even if the vapor deposition is performed at room temperature. However, if it is desired to further increase the adhesion, it is effective to heat the phosphor screen or fiber plate to 100°-300° C. Also, it is possible to select a desired contrast and a brightness of the phosphor screen by properly combining the vapor depositing conditions in the step of forming the light absorbing layer.

Formation of the light absorbing layer 20 by means of vacuum vapor deposition is advantageous in that the working environment is clean, the layer 20 can be made uniform, and that the productivity is high. It should also be noted that the formed light absorbing layer 20 does not fall, making it possible to prevent dust generation within the image tube.

The phosphor layer 10 in the phosphor screen of the present invention is not limited only to the particulate phosphor formed by precipitation, but may be formed of deposited phosphor formed by vapor deposition.

In the foregoing description, the light from the core 101 which has a large emitting angle to produce Fresnel's reflection in the output window was described. However, the light which has small emitting angle is not affected by the presence of the depressions 19.

Figure 8:
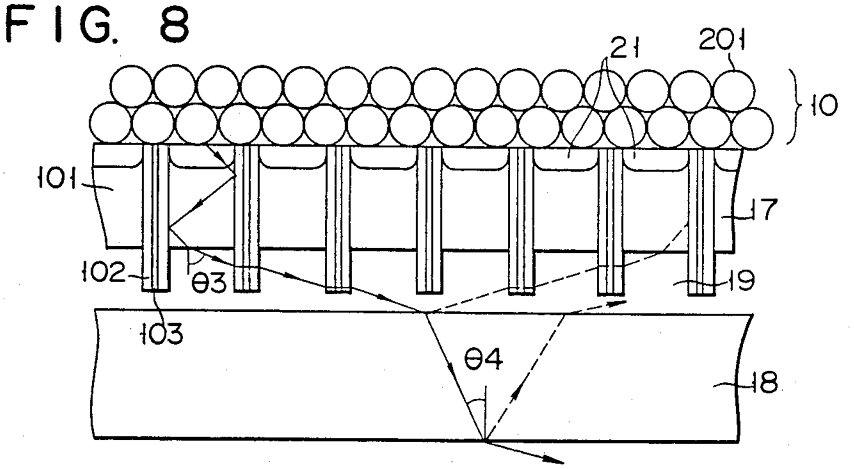
FIG. 8 is a sectional view showing the essential part of a phosphor screen according to other modified embodiment of the present invention.

In the embodiment in FIG. 6, the depressions 19 are provided on the side opposed to the output window 18 of the fiber plate 17. However, as shown in FIG. 8, the depression 21 may be formed on the surface formed with the phosphor layer 10. In this manner, a space is formed between the phosphor layer 10 and the core 101. Therefore, the light incident to the core 101 is always incident through the space. Accordingly, the incident angle of the light to the boundary between the core 101 and the clad 102 does not decrease lower than the critical angle, and accordingly all light is passed in the clad 102 so as not to be transmitted to the optical fiber, but transmitted in the core 101. Consequently, according to the phosphor screen shown in FIG. 7, the contrast of the output image and the brightness can be further improved.

As described above, the output phosphor screen of the present invention has been described. The present invention is not limited only to this particular embodiment but can be applied widely to the phosphor screen of the structure formed with the phosphor layer on one surface of the optical fiber plate.

What is claimed is:

1. A method of manufacturing a phosphor screen, comprising the steps of:

forming a phosphor layer on one surface of an optical fiber plate formed by bundling a number of single optical fibers, each formed of a cylindrical core and a clad covering the curved peripheral wall of said core;

forming depressions in said core but not in said clad of a depth of at least 1 μm by removing said core on the other surface of said optical fiber plate before or after the step of forming the phosphor layer so that said clad extends further away from said other surface than does said core; and disposing said output phosphor screen so that said other surface of said optical fiber plate opposes an output window of the image tube.

2. The method according to claim 1, wherein the removal of the end of said cylindrical core includes the step of treating the other surface of said optical fiber plate with an acid.

3. The method according to claim 1, which further comprises a step of forming a light absorbing layer on the side wall of the depression and/or the end surface of the projection defining the depression.

4. The method according to claim 3, wherein the light absorbing layer is formed by vacuum vapor deposition of a metal.

5. The method according to claim 2, wherein said acid is hydrochloric or nitric acid.

6. The method according to claim 2, wherein the treatment with said acid step includes the step of dipping said optical fiber plate in an acid solution.

7. The method according to claim 4, wherein the treatment with said acid is carried out in the state that a masking layer is formed on the surface of said phosphor layer after the step of forming said phosphor layer.

* * * * *